United States Patent [19]

Nagaura et al.

[11] 4,370,395

[45] Jan. 25, 1983

[54] ALKALINE CELL

[75] Inventors: Toru Nagaura, Koriyama; Takayuki Aita, Fukushima, both of Japan

[73] Assignee: Union Carbide Corporation, Danbury, Conn.

[21] Appl. No.: 270,100

[22] Filed: Jun. 3, 1981

[30] Foreign Application Priority Data

Jun. 4, 1980 [JP] Japan .................................. 55-75286

[51] Int. Cl.³ ........................ H01M 4/32; H01M 4/34
[52] U.S. Cl. .................................... 429/219; 429/223; 429/224
[58] Field of Search ........................ 429/219, 223, 224

[56] References Cited

U.S. PATENT DOCUMENTS 3,353,998  11/1967  Langguth et al. .................. 429/223

FOREIGN PATENT DOCUMENTS 56-15561  2/1981  Japan .................................. 429/219

OTHER PUBLICATIONS

"Crystalline Structures of $AgNiO_2$ and $CoHO_2$"; Bityutskii, P. N.: Khitrova, V. I. (Inst. Kristallogr., Moscow, USSR), Sh. Strukt. Khim, 1968 9(6), 1034–1039, (Russ).—D. B. Ocenaskova.

*Primary Examiner*—Donald L. Walton
*Attorney, Agent, or Firm*—Cornelius F. O'Brien

[57] ABSTRACT

Alkaline cell comprising a cathode material, an alkaline electrolyte and an anode material, which are sealed in a container, said cathode material containing an Ni- and Ag-containing oxide wherein the trivalent nickel ion ($Ni^{3+}$) and the monovalent silver ion ($Ag^+$) are present in a substantially equimolar ratio.

3 Claims, 10 Drawing Figures

ALKALINE CELL

FIELD OF THE INVENTION

The present invention relates to an alkaline cell employing a cathode which comprises an Ni- and Ag-containing oxide.

Nickel oxyhydroxide is popularly known as a cathode active material of a nickel cadmium cell while a cell using zinc as an anode material is also already disclosed. This nickel oxyhydroxide can generally be prepared by familiar methods, such as oxidation of nickel hydroxide in contact with ozone, electrolysis of a divalent nickel salt in a neutral or alkaline solution, or oxidation of the nickel salt by action of chlorine or bromine.

To give enough conductivity, nickel oxyhydroxide prepared by one of these methods has so far been mixed with 5 to 15% of an additive conductive agent such as graphite or carbon to form the cathode material for use in fabricating the nickel cell. However, this type of cell has a demerit that its discharge capacity is small though it has merits in having a comparatively flat discharge curve, is usable as a substitute for the silver oxide cell and has a cheaper production cost compared to the silver oxide cell.

SUMMARY OF THE INVENTION

The present invention, which is made in consideration of the above facts, is concerned with an alkaline cell comprising a cathode material, an alkaline electrolyte and an anode material, which are sealed in a container and wherein the cathode material comprises an Ni- and Ag-containing oxide having trivalent nickel ion ($Ni^{3+}$) and the monovalent silver ion ($Ag^+$) present in a substantially equimolar ratio. The phrase "containing an Ni- and Ag-containing oxide" as used herein refers not only to a case where such oxide is contained as a partial composition but to a case where such oxide provides almost 100% of the composition. In such construction, the additive conductive agent such as graphite or carbon can be omitted from the cathode material and, instead, a new substance of very high conductivity comprising the trivalent nickel ion and the monovalent silver ion (the above-mentioned Ni- and Ag-containing oxide) can by mixed in the cathode material to provide a cell of high capacity. The Ni- and Ag-containing oxide can be prepared by reacting an oxide of trivalent nickel with an oxide of monovalent silver such that the trivalent nickel ion and the monovalent silver ion are present in a substantially equimolar ratio.

It was discovered that the trivalent nickel oxide, for example, nickel oxyhydroxide (NiOOH) and the monovalent silver oxide ($Ag_2O$) react in the presence of an aqueous alkaline solution to produce a reaction product found to be a new oxide of remarkably low specific resistance. Further, it was discovered that use of this oxide as the cathode material provides an alkaline cell of excellent performance. Nickel oxyhydroxide can be prepared by familiar methods, such as oxidation of nickel hydroxide in contact with ozone, electrolysis of a divalent nickel salt in neutral or alkaline solution or oxidation of this nickel salt by action of chlorine or bromine. It was also found in an experiment as will be described later that a compound which is obtained by reacting nickel oxyhydroxide (NiOOH) made available by one of the above methods with $Ag_2O$ in an aqueous alkaline solution, for example, in a potassium or sodium hydroxide solution, has a remarkably low specific resistance as compared to the parent compounds, nickel oxyhydroxide and silver oxide, and that the compound can be used as the cathode active material to provide a cell that is characterized by a remarkably large capacity and an excellent performance in the discharge characteristics.

The above new oxide compound used in this invention was found to comprise a new phase according to the results of an X-ray diffraction analysis which showed its diffraction pattern to be very similar to the one of $AgCoO_2$ (hexagonal phase) in the ASTM Card No. 25-761 which suggests the compound to be possibly $AgNiO_2$. This compound has a very low specific resistance and it can be used as a superior cathode active material for cells that discharge at about 1.45 to 1.40 volts. In this invention, therefore, the compound can be used alone or mixed with nickel oxyhydroxide to form a cathode. This new compound gives the cathode enough conductivity and, in addition, increases the capacity of the cathode by contrast to an additive conductive agent such as graphite or carbon.

BRIEF DESCRIPTION OF THE DRAWINGS

Drawings are given for the description of the invention as follows.

The invention will be described further by way of examples, though these examples are given only to describe the invention and, therefore, they can be modified according to the novel concept of this invention.

First, in the following experiment, the new oxide compound was prepared for use as a cathode material as follows:

500 cc of aqueous 10 mol/l potassium hydroxide solution and 100 cc of aqueous 2 mol/l nickel sulfate solution were added to 200 cc of aqueous 2 mol/l sodium hypochloriate solution and the resultant mixture was well mixed. Black precipitates ($\gamma$-NiOOH) produced were washed well with pure water and the waste lye was removed by filtration. The precipitates were dried 20 hours in a thermostatic oven of 60° C. and then pulverized to put through a 100-mesh sieve. 10 g of the powder fraction that passed through the sieve was weighed and this 10 g of nickel oxyhydroxide (NiOOH) was added to 300 cc of aqueous 5 mol/l silver nitrate solution and then 100 cc of aqueous 1 mol/l silver nitrate solution (1 N $AgNO_3$) was added to the mixture under enough agitation. The agitation was continued 16 hours at 60° C. and the resultant precipitates (new Ni- and Ag-containing oxide) were separated by filtration, washed with water and dried to give a test sample. Another five samples were similarly prepared by changing the volume of aqueous silver nitrate solution added to 10 g of nickel oxyhydroxide.

These six samples were pelletized in a size of 11.0 mm diameter under a pressure of 5 t/cm². The specific resistance of each sample was measured and plotted on the graph shown in FIG. 1. The samples indicated by arrows A, B, C and D in FIG. 1 and silver oxide powder (Sample E) were subjected to an X-ray diffraction analysis. FIGS. 2 to 6 show the diffraction patterns of these samples. As a result of this analysis, the Sample A was identified as $\gamma$-NiOOH. Sample B showed formation of a substance having a new phase, namely, it was a mixture of nickel oxyhydroxide and a new substance. Further, Sample C, which was produced by adding 78 cc of 1 mol/l $AgNO_3$ to 10 g of nickel oxyhydroxide prepared in the above experiment, was found, according to the X-ray diffraction pattern, to consist almost fully of the above mentioned new substance having a new phase. Beside, as for Sample D, comparison to the X-ray diffraction pattern of silver oxide ($Ag_2O$) clearly showed that this sample was a mixture of the new substance and silver oxide.

There was no ASTM card that corresponded to this new substance having a new phase but an analogy to the X-ray diffraction pattern of $AgCoO_2$ (hexagonal phase) as given in ASTM Card No. 25-761 suggested that the substance was possibly $AgNiO_2$.

Figure 1:
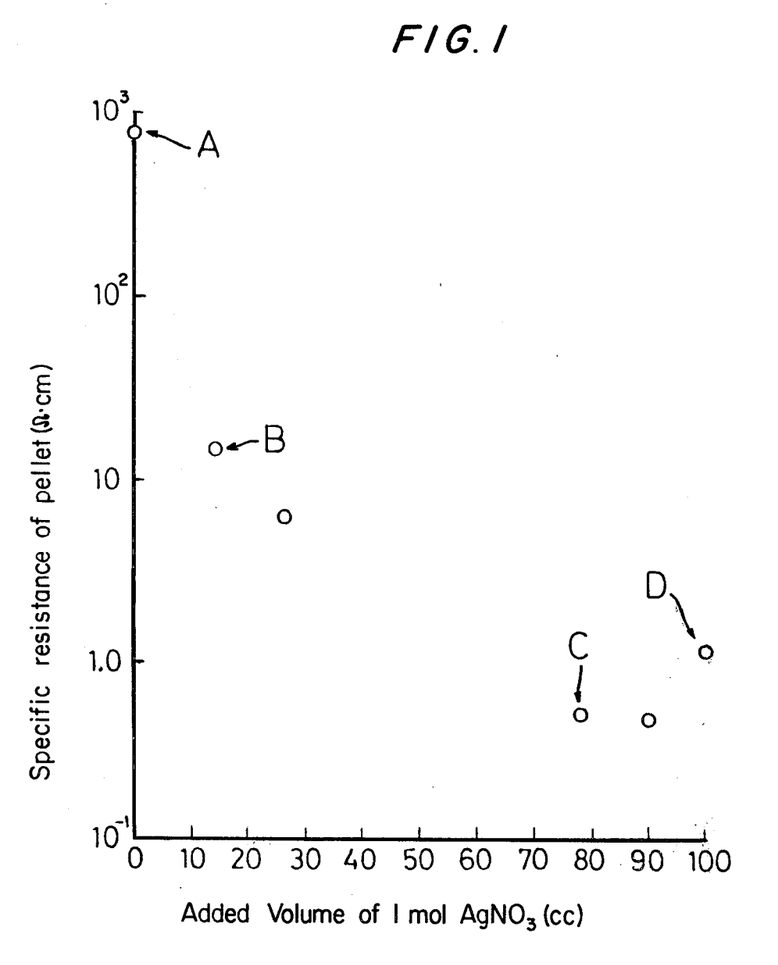
FIG. 1 is a curve of the specific resistance of pelletized cathode material versus the added quantity of $AgNO_3$.

Further, the 10 g sample of nickel oxyhydroxide made available by this experiment was found, according to an analysis by atomic absorption spectroscopy, to contain approximately 5.25 g (0.089 mol) of nickel while an addition of about 80 to 90 ml of aqueous 1 mol/l $AgNO_3$ solution (approximately 0.08 to 0.09 mol of $Ag^+$) to the 10 g sample of nickel oxyhydroxide minimized the specific resistance of product as illustrated in FIG. 1. These facts also supported the idea that the new substance comprised the trivalent nickel and monovalent silver in the equimolar ratio. Thus, Sample C whose X-ray diffraction pattern as given in FIG. 4 fully corresponded to the new substance of new phase was analyzed by the atomic absorption spectroscopy for the Ni and Ag contents. The next table gives the results, which showed a very close correspondence to the theoretical estimates for $AgNiO_2$.

|  | Atomic Percent | |
| --- | --- | --- |
|  | Ag | Ni |
| Analytical data for Sample C | 54.49% | 28.16% |
| Theoretical estimates for $AgNiO_2$ | 54.3% | 29.56% |

Figure 2:
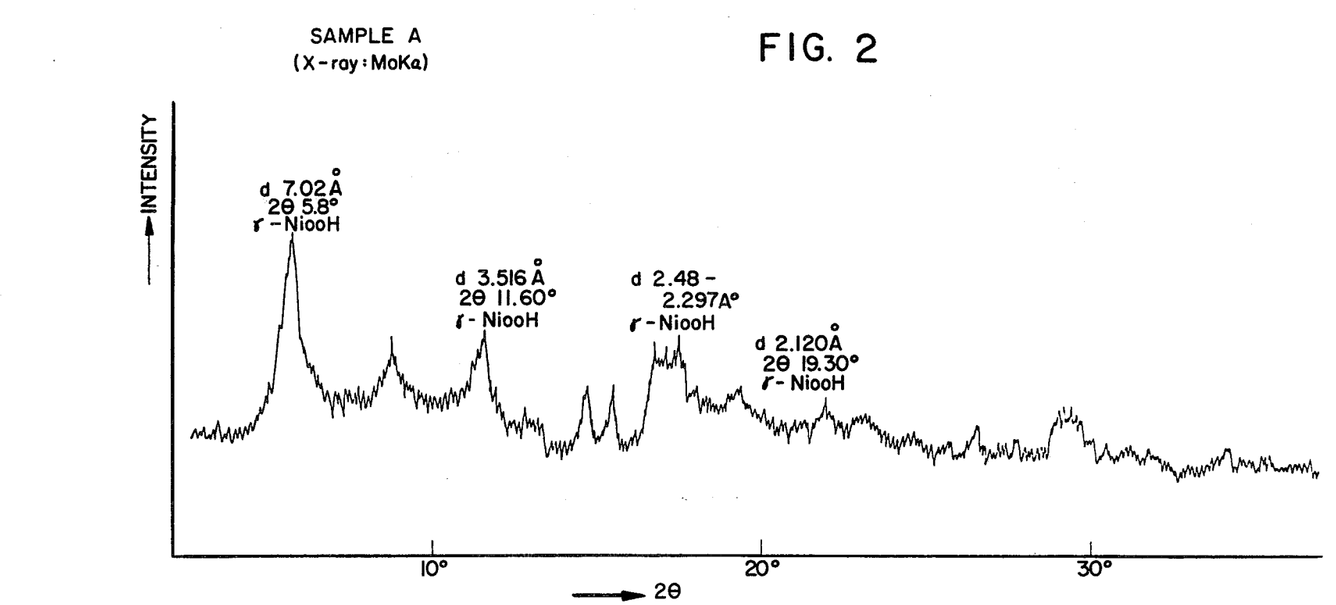
FIGS. 2 to 6 are the X-ray diffraction patterns of individual samples of cathode materials.
Figure 3:
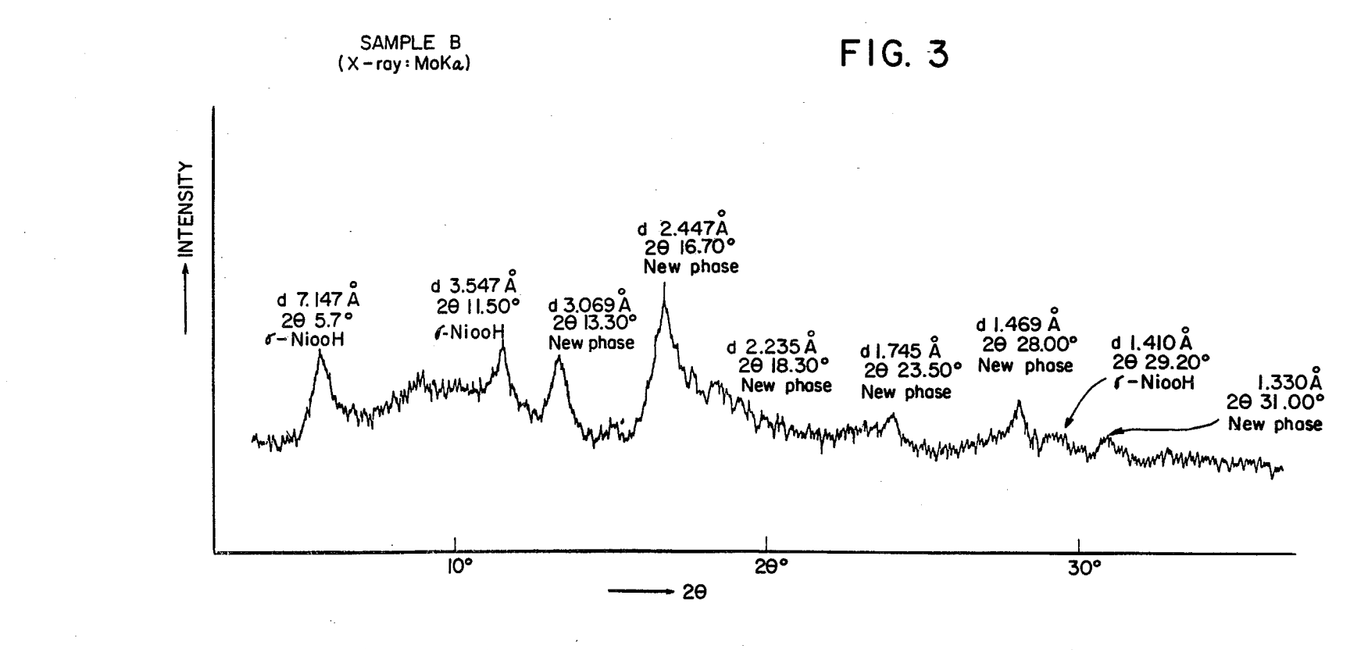

It could be concluded from the above analytical data that the new substance characterized by the X-ray diffraction pattern for Sample C in FIG. 2 is probably $AgNiO_2$.

It is believed that there is much dissolution of $Ag_2O$ in aqueous alkali hydroxide solution to produce $AgO^-$ ion. Thus, it seems that in the alkaline solution the bond NiO-OH of nickel oxyhydroxide is not so stable and, therefore, $AgNiO_2$ is produced by the following reaction:

$$AgO^- + NiO\text{-}OH \rightarrow AgO\text{-}NiO + OH^-.$$

The new substance thus made available has a very high conductivity compared to the conventional cathode materials of cell, such as $Ag_2O$, HgO and $MnO_2$. Therefore, by contrast to the conventional cathode active materials that are mixed with an additive conductive agent such as graphite or carbon to form a cathode, the new substance that is conductive requires no additive conductive agent and can form a cathode without the addition of any other material for use in a cell having a large capacity.

Examples of the invention will now be described concretely.

EXAMPLE 1

Figures 6, 7:
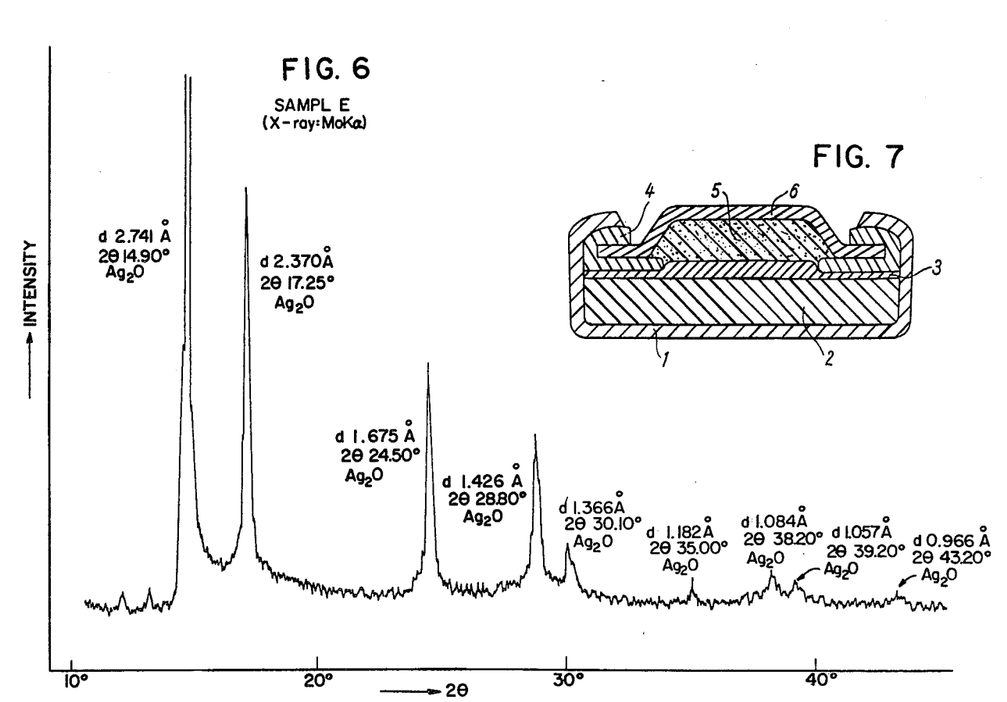
FIG. 7 is a cross section of an alkaline cell.

Nickel oxyhydroxide was prepared by the same method as described in the above experiment. 100 g of nickel oxyhydroxide was added to 3 liters of aqueous 5 mol/l potassium hydroxide solution and 0.9 liters of aqueous 1 mol/l silver nitrate solution was then added under agitation. After continuation of the agitation for 16 hours, the mixture was filtrated to separate precipitates, which were washed with water and then dried at 80° C. to give a cathode active material. 0.25 g of this active material was used to form a pellet of 11.0 mm in diameter under a pressure of 3 t/cm² which was positioned in a cathode case under pressure to give a cathode 2 as shown in FIG. 7. Thereafter a separator 3 comprising a cellophane sheet or a cloth of cotton fabric was placed and 45% KOH solution was added as the electrolyte. An anode case 6 that was filled with zinc mercurate-based anode gel 5 was placed thereon with insertion of a nylon gasket or packing 4 and the openings were sealed, resulting in a cell of dimensions 11.6 mm × 2.0 mm as shown in FIG. 7.

Figure 8:
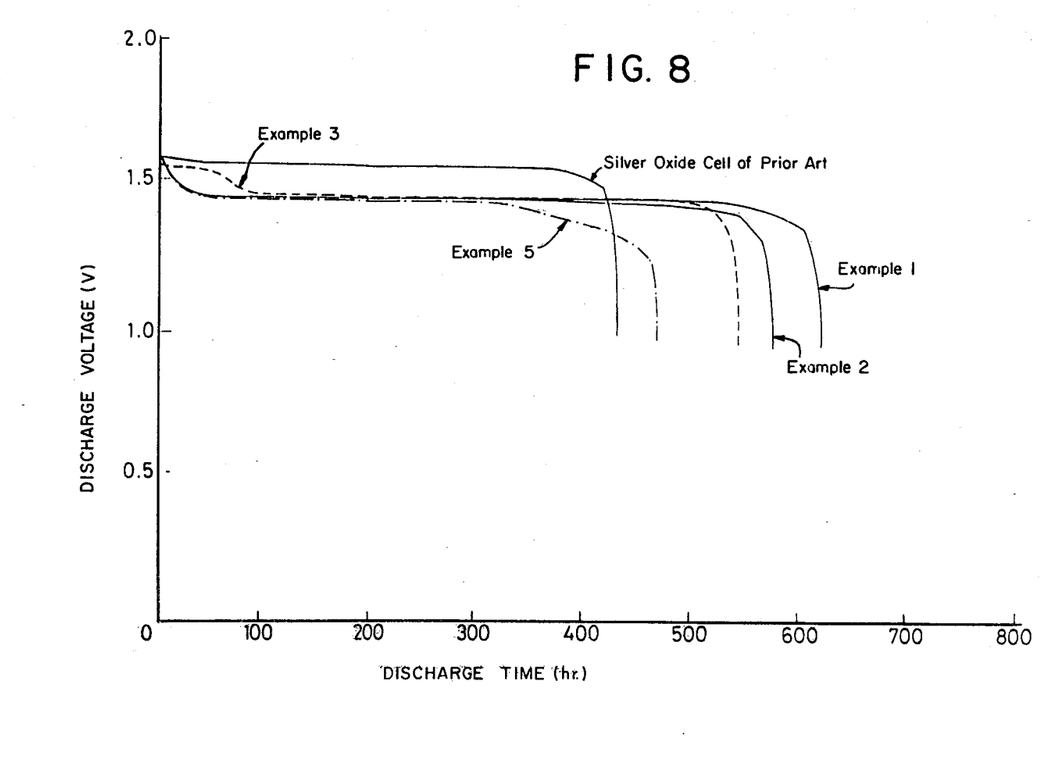
FIG. 8 is the characteristic discharge curve of an alkaline cell as described in Examples 1, 2, 3 and 5.

A cell thus prepared was allowed to discharged through a resistor of 15 k$\Omega$. FIG. 8 gives the results of this discharge of the Example 1 cell. FIG. 8 shows that the cell with a quite flat discharge curve at a level of approximately 1.45 V was obtained. Among these types of cells, the silver cell is ranked best. The above cell (Example 1 cells) was thus compared to the silver cell by adding a characteristic curve of a silver cell of the same size in FIG. 8. Thus the cell of this invention showed a remarkable performance even when compared to the silver cell. Namely, the discharge curve was as flat as that of the silver cell and the discharge time was prolonged 40% even though the discharge voltage was approximately 0.1 V lower.

EXAMPLE 2

Added to 200 cc of aqueous 2 mol/l sodium hypochlorite solution were 500 cc of aqueous 10 mol/l potassium hydroxide solution and 100 cc of aqueous 2 mol/l nickel nitrate solution and the mixture was agitated 5 minutes for mixing. Further, 100 cc of aqueous 2 mol/l silver nitrate solution was added to this mixture and the solution was continuously agitated about 16 hours. Black precipitates that were produced were washed well with pure water and the waste lye was removed by filtration. The precipitates were then dried at 80° C. to give a cathode active material. Next, 0.25 g of this cathode active material was weighed to form a pellet of 11.0 mm in diameter, with which a cell of dimensions 11.6 mm diameter × 2.0 mm was assembled in the same procedure as in Example 1. The cell was almost equivalent in performances to the one of Example 1 though the discharge time was somewhat shorter than the Example 1 cell as evident by the discharge curve of the Example 2 cell shown in FIG. 8. The shorter discharge time was probably casued by the presence of AgCl mixed in the active material produced.

EXAMPLE 3

14.9 g of divalent silver oxide AgO was added to a 10 mol/l potassium hydroxide solution and the mixture was well agitated. A solution of 21 g of nickel sulfate (NiSO$_4$.6H$_2$O; commercial product of extra pure grade) in 100 cc of pure water was added to the solution and the mixture was agitated 16 hours. Thereafter the black precipitates were well washed with pure water and the waste lye was removed by filtration. The precipitates were dried 16 hours at 80° C. to give a cathode active material. This active material was used to assemble a cell of dimensions 11.6 mm diameter×2.0 mm as in Examples 1 and 2. The performance of the cell was observed. As illustrated in FIG. 8, at the start of discharge, a voltage of approximately 1.55 V was measured for this Example 3 cell but it dropped in a short time to a flat steady level of 1.45 V at which the discharge continued.

It can be inferred from the above that in this Example a cathode active material that was almost the same as those obtained in Examples 1 and 2 was made available by the following reaction formulae:

$$2AgO + 2Ni(OH)_2 \rightarrow Ag_2O + 2NiOOH + H_2O$$
$$2AgO \rightarrow Ag_2O + \tfrac{1}{2}O_2.$$

Namely, the divalent silver oxide oxidizes Ni(OH)$_2$ that was formed from nickel sulfate in an alkaline solution while partially decomposing to isolate oxygen. As a result, Ag$_2$O and NiOOH were formed to react and generate a new material that was assumed to be AgNiO$_2$ as in the aforementioned experiment. In the present Example, however, Ag$_2$O was produced a little more than nickel oxyhydroxide, so some Ag$_2$O was left. This was why a voltage of 1.55 V was observed at the start of the cell's characteristic discharge curve.

As described above, it was found that a reaction of nickel oxyhydroxide and silver oxide in an alkaline solution gave a new substance that was considered to be AgNiO$_2$ and this substance was very useful as the cathode active material of the cell. The aforementioned new substance considered to be AgNiO$_2$ can be produced by a reaction of the trivalent nickel and monovalent silver oxide in an equimolar ratio in alkaline solution as shown in this Example. One of the representative methods of its production is a process wherein nickel oxyhydroxide is produced at the first step, which undergoes a reaction with silver oxide in alkaline solution. However, as shown in this Example, the material proposed by this invention can be prepared if a process includes a step of reacting the trivalent nickel and monovalent silver in alkaline solution.

EXAMPLE 4

100 cc of 1 mol/l Ni(NO$_3$)$_2$ solution and 100 cc of 1 mol/l AgNO$_3$ solution were mixed and the mixture was poured into aqueous 10 mol/l KOH solution. Added to the mixture under enough agitation was 8 g of potassium peroxydisulfate (K$_2$S$_2$O$_8$) every hour at five times, namely, 40 g in total. After addition of the last dose of oxidizer, the agitation was continued 3 hours. The product was removed by filtration, washed with alkaline solution, dried at about 80° C. and then pulverized. The resultant powder gave quite the same results as obtained in Example 1.

As in Example 3, it was considered that in the production process of this Example Ni(OH)$_2$ was oxidized by the oxidizer (K$_2$S$_2$O$_8$) in alkaline solution to result in nickel oxyhydroxide, which reacted with Ag$_2$O to produce the same product as in Example 1. Namely, in alkaline solution, the following reactions probably occurred:

$$Ni(NO_3)_2 + 2KOH \rightarrow Ni(OH)_2 + 2KNO_3$$

$$2AgNO_3 + 2KOH \rightarrow Ag_2O + 2KNO_3 + H_2O.$$

Figure 4:
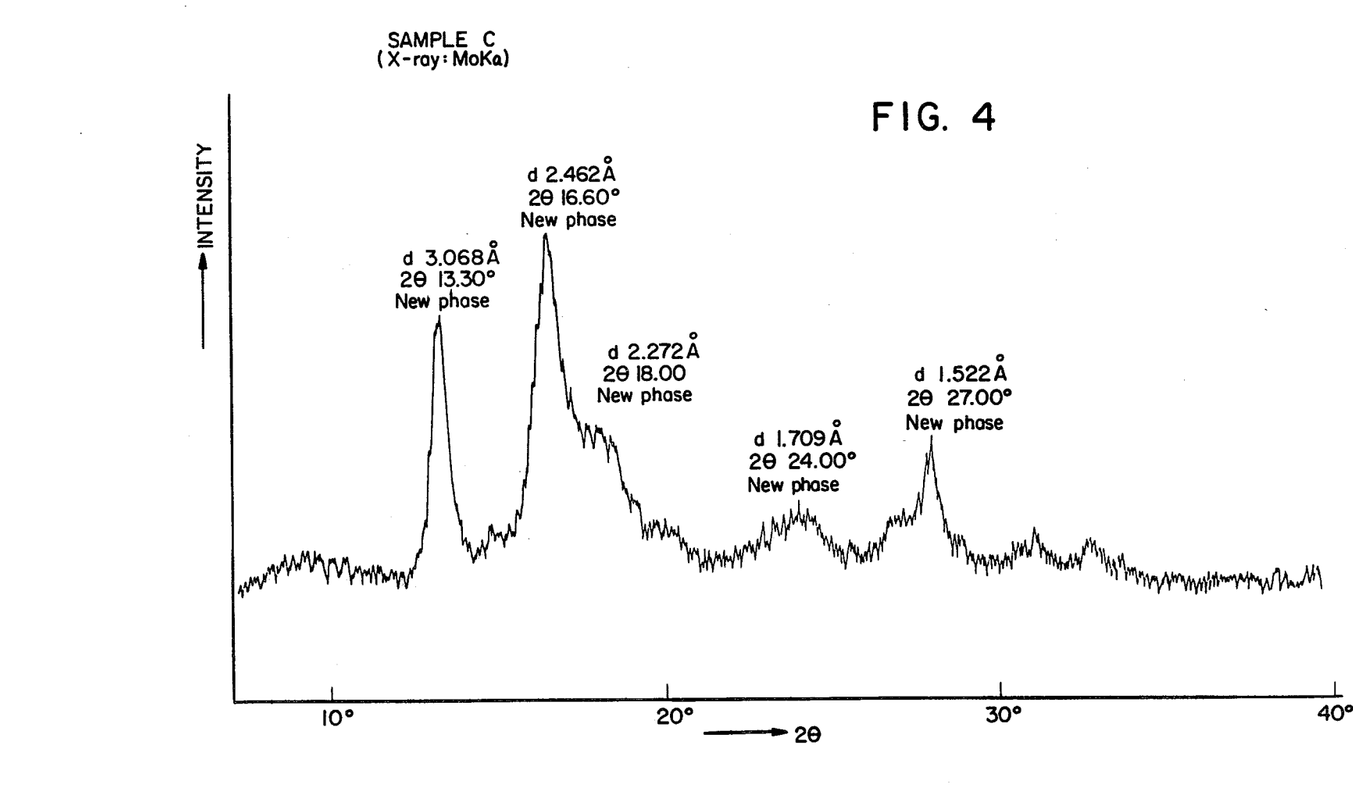
Figure 5:
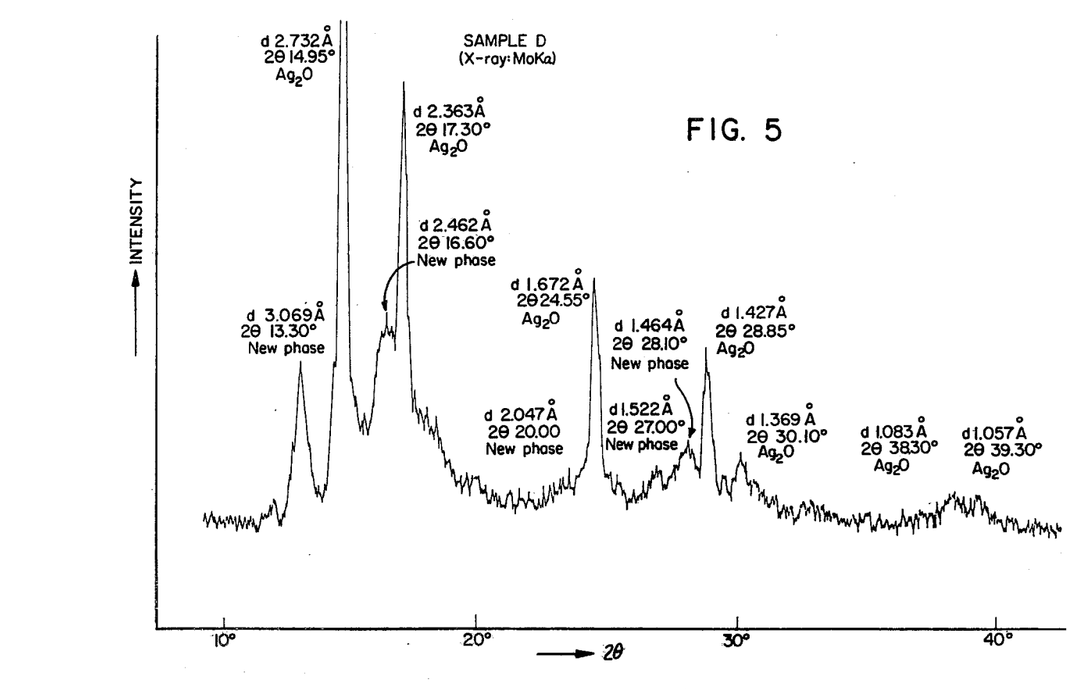

These reactions led to production of nickel hydroxide (Ni(OH)$_2$) and silver oxide (Ag$_2$O). The former was oxidized by the oxidizer potassium peroxydisulfate to nickel oxyhydroxide (NiOOH), which underwent, as in Example 1, the following reaction:

$$NiOOH + AgO^- \rightarrow AgNiO_2 + OH^-,$$

resulting in a product that was characterized by an X-ray diffraction pattern as given for Sample C in FIG. 4.

The above product considered to be AgNiO$_2$ performs excellently as a cathode active material having a very good conductivity as illustrated in FIG. 1. Therefore, it is possible to mix it with one or more of the substances that have conventionally been used as the cathode active material, such as Ag$_2$O, AgO, MnO$_2$, HgO and NiOOH. Namely, the conventional cathode active materials are generally poorly conductive materials and, therefore, they have been mixed with an additive conductive agent, such as graphite or carbon, when used for the cathode active material. In this case, since graphite or carbon has a comparatively small specific gravity, it occupies a considerable fraction of the cathode volume. It is needless to say that though much addition of such additive conductive agent has a favorable result in reducing the internal resistance of cell, it decreases the capacity of cell. Therefore, if mixed with the substance discovered by this invention instead of an additive conductive agent such as graphite or carbon, the conventional active materials Ag$_2$O, MnO$_2$ and HgO will be given an electric conductivity while the added substance itself can perform as an active material. Thus the substance can be mixed in any percentage which is adequate to produce sufficient conductivity (generally 10% or more). This permits designing cells of large capacity with additional features of conventional active material for various application. An example of mixing with MnO$_2$ which is the cheapest of the conventional active materials will be given below.

EXAMPLE 5

64 parts of the active substance obtained in Example 1 and considered to be AgNiO$_2$ was well mixed with 36 parts of MnO$_2$. 0.19 g of the mixture was weighed and used to assemble a cell of dimensions 11.6 mm diameter×2.0 mm as in Example 1. The cell was allowed to continuously discharge through a resistor of 15 kΩ. The characteristic discharge curve of this Example 5 cell is also given in FIG. 8. Even when compared to the silver oxide cell that is believed to perform the best among the conventional cells, an almost equivalent capacity was available though the discharge voltage was slightly lower. However, it is seen from the next table that if compared to the prior art cell of same size, the quantity of silver used in the cathode was about 35%, which meant a saving of about 0.12 silver per cell and a large reduction in cost.

| | Cell in Example 5 | Silver cell of prior art |
| --- | --- | --- |
| Silver used | 0.066 g | 0.186 g |

| | Cell in Example 5 | Silver cell of prior art |
|---|---|---|
| Capacity of cell | 44.5 mAH | 45 mAH |

EXAMPLE 6

First, 500 cc of aqueous 10 mol/l potassium hydroxide and then 100 cc of 2 mol/l nickel sulfate solution were added to 200 cc of aqueous 2 mol/l sodium hypochlorite solution and the mixture was well mixed. Black precipitates produced were well washed with pure water and the wash was removed by filtration. The precipitates were dried in a thermostatic oven of 60° C. to give a powder of nickel oxyhydroxide. The powder was subjected to an X-ray diffraction analysis. FIG. 2 is an X-ray diffraction pattern of γ-NiOOH thus obtained. Next, 10 g of the product nickel oxyhydroxide (γ-NiOOH) was added into 300 cc of aqueous 5 mol/l potassium hydroxide solution. 90 cc of aqueous 1 mol/l silver nitrate solution was then added thereto under agitation and the agitation was continued 16 hours. Precipitates were separated by filtration, washed with water and dried at 80° C. to give an active material. The product was further subjected to an X-ray diffraction analysis, which resulted in a diffraction pattern similar to the one given for Sample C in FIG. 4. It was quite different from the diffraction pattern of γ-NiOOH in FIG. 2 and the one of Ag$_2$O in FIG. 6.

Figure 9:
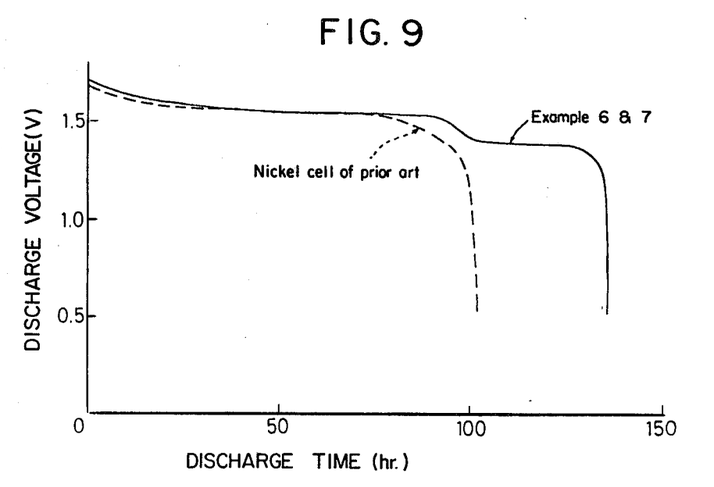
FIG. 9 is a discharge curve of a cell as described in Examples 6 and 7.

The new substance thus produced and nickel oxyhydroxide produced previously were mixed in a weight ratio of 30 parts to 70 parts. 0.17 g of this mixture was weighed, from which a pellet of 11.0 mm diameter was formed under pressure. The cathode case of the cell was then filled up with the pellet under pressure to form the cathode as illustrated in FIG. 7. Thereafter, a separator comprising a cellophane sheet and a cloth of cotton fabric was placed thereon, to which 45% KOH solution was added as the electrolyte. An anode case filled up with zinc mercurate-based cathode gel was placed with insertion of a nylon packing and the openings were sealed to give a cell of 11.6 mm diameter×2.0 mm. Further, for comparison, 90 parts of nickel oxyhydroxide was mixed with 10 parts of graphite to assemble a cell of the same size (of prior art). Both cells were allowed to discharge through a resistor of 6.5 kΩ. Their characteristic discharge curves are shown in FIG. 9. The Figure shows that the nickel zinc cell embodying the present invention is expected to have a capacity increase of more than 35% on the discharge time basis compared to the one of prior art.

EXAMPLE 7

26.7 g of nickel oxyhydroxide made available by the same method as in Example 6 was added to 300 cc of aqueous 5 mol/l potassium hydroxide solution. 40 cc of aqueous 1 mol/l silver nitrate solution was added to the mixture under agitation and the agitation was continued 16 hours. The precipitates were separated by filtration, washed with water and dried at 80° C. Their powder was subjected to an X-ray diffraction analysis, which gave a diffraction pattern like the one given for Sample B in FIG. 3. It was found from this that the powder produced here was a mixture of γ-NiOOH and Sample C obtained in Example 6. Also this powder had enough conductivity for use as the cathode of the cell. 0.17 g of the powder was weighed to form a pellet of 11.0 mm diameter, which was used to assemble a cell of 11.6 mm diameter×2.0 mm as in Example 6. The cell discharged as in Example 6 and the results obtained are shown in FIG. 9 which showed that it had almost the same characteristics as the cell assembled in Example 6.

EXAMPLE 8

Figure 10:
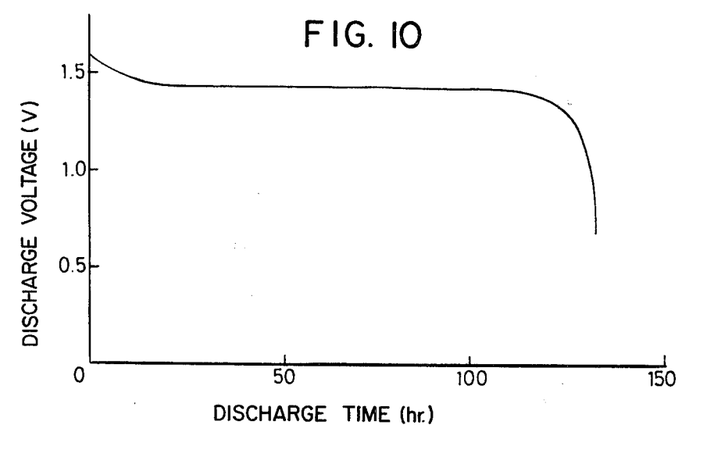
FIG. 10 is a characteristic discharge curve of a cell whose cathode is made only of Sample C.

80 parts of nickel oxyhydroxide produced by the same method as in Example 6 was mixed with 20 parts of Ag$_2$O and the mixture was pelletized to assemble a cell as in Examples 6 and 7. The performance of the cell was observed. Though no graphite was added, it showed a sufficiently low internal resistance, its capacity being 20% higher than the cell of the prior art, though the method in this Example was found to be inferior to those in Examples 6 and 7. Also in this Example, a plateau corresponding to discharge at 1.4 V was detected in the latter part of a characteristic discharge curve. A characteristic discharge curve of a cell whose cathode was made only of the Sample C obtained in Example 6 is shown in FIG. 10. The Figure indicates that the substance characterized by the X-ray diffraction pattern for Sample C discharged at a level about 0.1 to 0.2 V lower than nickel oxyhydroxide. Therefore, it is concluded that the plateau observed in the latter part of a characteristic discharge curve in each of Examples 6 to 8 was associated with a voltage generated by the discharge of a substance that was mixed with nickel oxyhydroxide (Examples 6 and 7) or produced by a reaction of nickel oxyhydroxide and Ag$_2$O (Example 8) and characterized by the X-ray diffraction pattern of Sample C.

The alkaline cells conforming to the above Examples 6 to 8 are characterized by a fact that the nickel oxyhydroxide-based cathode of cell contains the monovalent silver (Ag$^+$), which partially or fully undergoes a reaction with nickel oxyhydroxide to form a substance identified with an X-ray diffraction pattern of Sample C.

What is claimed is:

1. An alkaline cell comprising a cathode material, an alkaline electrolyte and an anode material and wherein the cathode material comprises an Ni- and Ag-containing oxide having trivalent nickel ion and monovalent silver ion present in a substantially equimolar ratio.

2. The alkaline cell of claim 1 wherein the cathode material contains another cathode component besides the Ni- and Ag-containing oxide.

3. The alkaline cell of claim 2 wherein the another cathode component is selected from the group consisting of Ag$_2$O, AgO, MnO$_2$, HgO and NiOOH.

* * * * *

UNITED STATES PATENT AND TRADEMARK OFFICE
CERTIFICATE OF CORRECTION

PATENT NO. : 4,370,395
DATED : January 25, 1983
INVENTOR(S) : Toru Nagaura and Takayuki Aita It is certified that error appears in the above—identified patent and that said Letters Patent is hereby corrected as shown below:

Title Page, after "Assignee" delete "Union Carbide Corporation, Danbury, Conn." and substitute therefor --Sony Eveready Inc., Tokyo, Japan--

Column 6, line 62, after "0.12" add --g--

Signed and Sealed this

Twenty-eighth Day of June 1983

[SEAL]

Attest:

GERALD J. MOSSINGHOFF

Attesting Officer

Commissioner of Patents and Trademarks